United States Patent [19]

Strnad et al.

[11] Patent Number: 5,655,795

[45] Date of Patent: Aug. 12, 1997

[54] THROTTLE BODY INLET DUCT

[75] Inventors: Ronald Lee Strnad, Flushing, Mich.;
Dawn Marie Lervik, Gilbert, Ariz.;
Daniel Glenn Stuart, North Branch, Mich.

[73] Assignee: General Motors Corporation, Detroit, Mich.

[21] Appl. No.: 526,967

[22] Filed: Sep. 12, 1995

[51] Int. Cl.⁶ .................................................. F16L 17/02
[52] U.S. Cl. ........................ 285/110; 285/305; 285/283; 285/379; 123/337
[58] Field of Search .................................. 285/110, 379, 285/305, 283; 123/184.61, 403, 337

[56] References Cited

U.S. PATENT DOCUMENTS

| | | | |
|---|---|---|---|
| 533,761 | 2/1895 | Walker et al. | 285/283 |
| 2,098,423 | 11/1937 | Kennedy | 285/283 |
| 4,343,480 | 8/1982 | Vassalls | 285/110 |
| 4,735,440 | 4/1988 | Sauer | 285/110 |
| 5,106,127 | 4/1992 | Briet | 285/110 |
| 5,158,045 | 10/1992 | Arthur et al. | 123/337 |
| 5,341,773 | 8/1994 | Schulte et al. | 285/305 |
| 5,435,605 | 7/1995 | Koumatsu et al. | 285/110 |
| 5,474,039 | 12/1995 | Döragrup | 123/184.61 |

*Primary Examiner*—Eric K. Nicholson
*Attorney, Agent, or Firm*—Karl F. Barr, Jr.

[57] ABSTRACT

An inlet duct and seal assembly is disclosed having, as its preferred application, the attachment of an intake air transfer duct to the throttle body of an internal combustion engine. The throttle body is provided with an inlet opening about which extends an annulus defining an outer annular wall. The inlet air duct has an opening which corresponds in diameter to that of the annular outer wall. A seal is disposed in the duct opening and includes an inwardly, radially directed wiper seal which is flexibly deformed between the annular wall and the duct opening when the duct opening is engaged over the throttle body inlet. A pivot clip extends from the inlet duct to engage a shelf on the throttle body to thereby position the duct opening with respect to the throttle body annulus to assure a proper seal and to simplify assembly of the components,

2 Claims, 3 Drawing Sheets

THROTTLE BODY INLET DUCT

TECHNICAL FIELD

The present invention is directed to throttle body inlet ducting and related connections for an internal combustion engine.

BACKGROUND

Inlet systems for automotive internal combustion engines typically include a number of transfer ducts which extend between the combustion air inlet and the throttle body of the engine. The transfer ducts may be constructed of one or more materials which can be flexible or rigid and each of the ducts is required to join with its associated duct, or the inlet end of the throttle body, in an air-tight manner. The requirement for an air-tight connection between adjacent ducts, and at the duct/throttle body interface, stems from the precise metering of air at the engine inlet and the desire to eliminate the ingress of contaminants to the air flow.

A common sealing method for joining the components of an intake system is a compression seal which requires a seal and band-clamp combination to compress the joint until adequate sealing is achieved. Such a seal is time consuming to install, in many instances, as it requires manual tightening of the band-clamp while the seal is held in position. In addition, the compression seal may be prone to material degradation due to the exposed nature of its design.

SUMMARY OF THE INVENTION

The present invention is directed to an inlet duct and seal for use in the transfer ducting of an internal combustion engine. The preferred application of the disclosed invention is at the transfer duct/throttle body interface, although other uses are contemplated. A throttle body of an engine includes a throat through which combustion air entering the engine passes. The inlet end, or opening of the throttle body defines an axially extending annulus, and an associated annular outer wall, about the inlet which terminates at a shelf or shoulder. A preferably rigid, transfer duct is configured to mate with the inlet annulus of the throttle body. The inlet duct includes an opening having a diameter corresponding to the annular outer wall of the throttle body and which is configured to accept a portion of the wall therein. The throttle body shoulder operates to limit the entry of the annulus into the opening in the transfer duct. A wiper seal is disposed about the perimeter of the transfer duct opening and operates between the duct opening and the annular wall to seal the connection. Secure attachment of the transfer duct end portion to the throttle body annulus is a requirement if disengagement from the throttle body is to be avoided during operation. Installation, and retention is facilitated through a pivot clip integral with the transfer duct and configured to engage a portion of the throttle body allowing the transfer duct opening to be pivoted into positive engagement with throttle body annulus thereby assuring an air-tight seal between the components while substantially simplifying the installation. Additional retaining members may be employed to positively lock the transfer duct into place on the throttle body annulus.

DESCRIPTION OF THE PREFERRED EMBODIMENT

Figure 1:
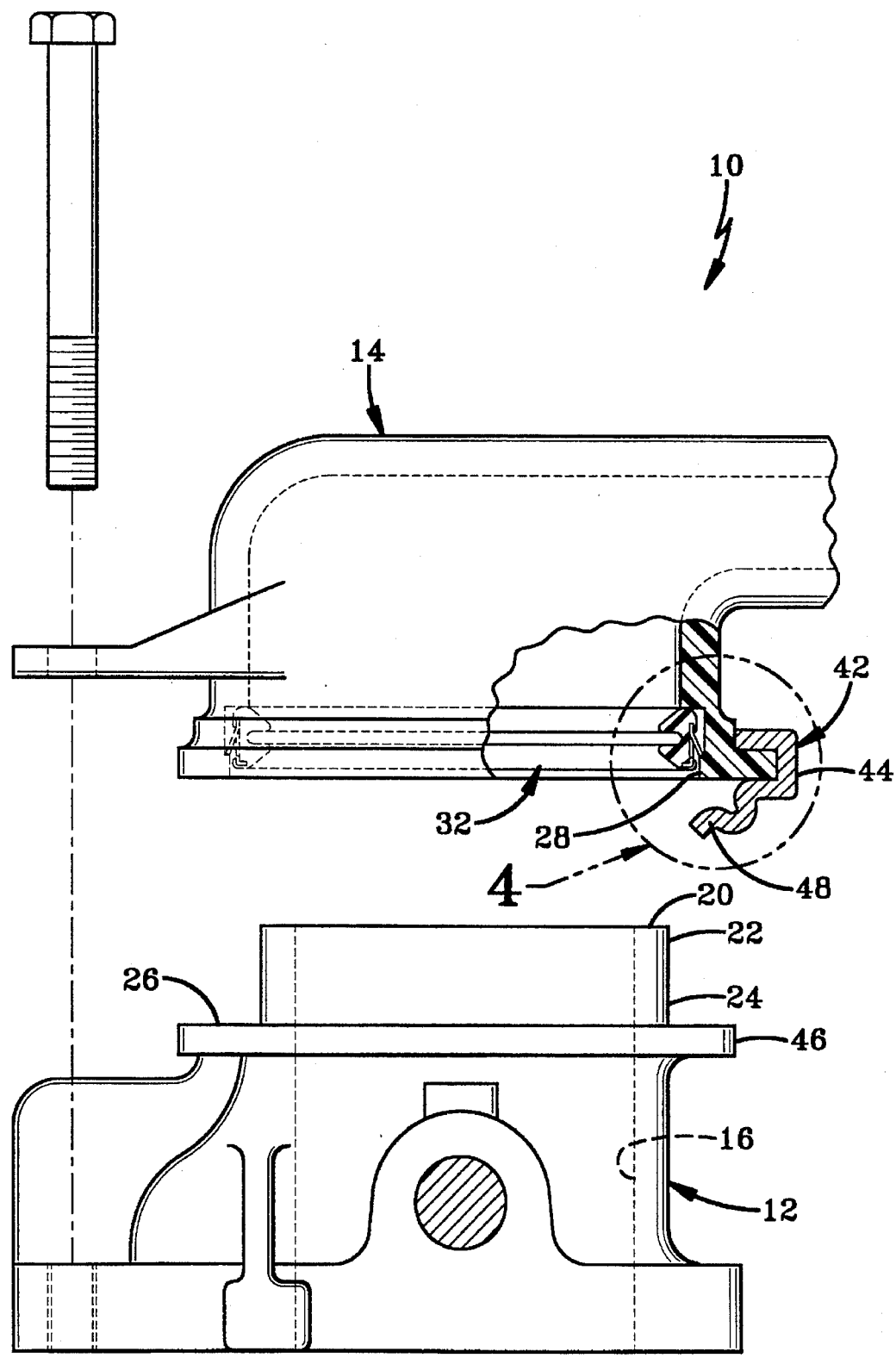
FIG. 1 is a partially expanded, partially sectioned side view of an inlet assembly for an automotive internal combustion engine embodying features of the present invention.

In FIG. 1 there is illustrated a portion of an air induction system, designated generally as 10, for use on an automotive internal combustion engine, not shown. The portion of the system disclosed in FIG. 1 includes a throttle body assembly 12 and a transfer duct 14. Combustion air entering the engine is conducted from a remotely located air inlet, through transfer duct 14 to the throttle body 12. It should be noted that the transfer duct 14 typically comprises several separate portions and may also include components such as an air filter and metering devices, not shown. In such instances, it is desirable that transfer ducting downstream of these components remain free from leakage which will affect the operation of the engine.

The throttle body assembly 12 includes a longitudinally extending throat 16 through which combustion air passes and in which is pivotally disposed a throttle plate, not shown, for regulating the flow of air therethrough. The inlet end 20 of the throttle body throat 16 is defined by annulus 22. The annulus 22 defines an annular outer wall 24 which extends longitudinally and terminates at shoulder 26.

Figure 4:
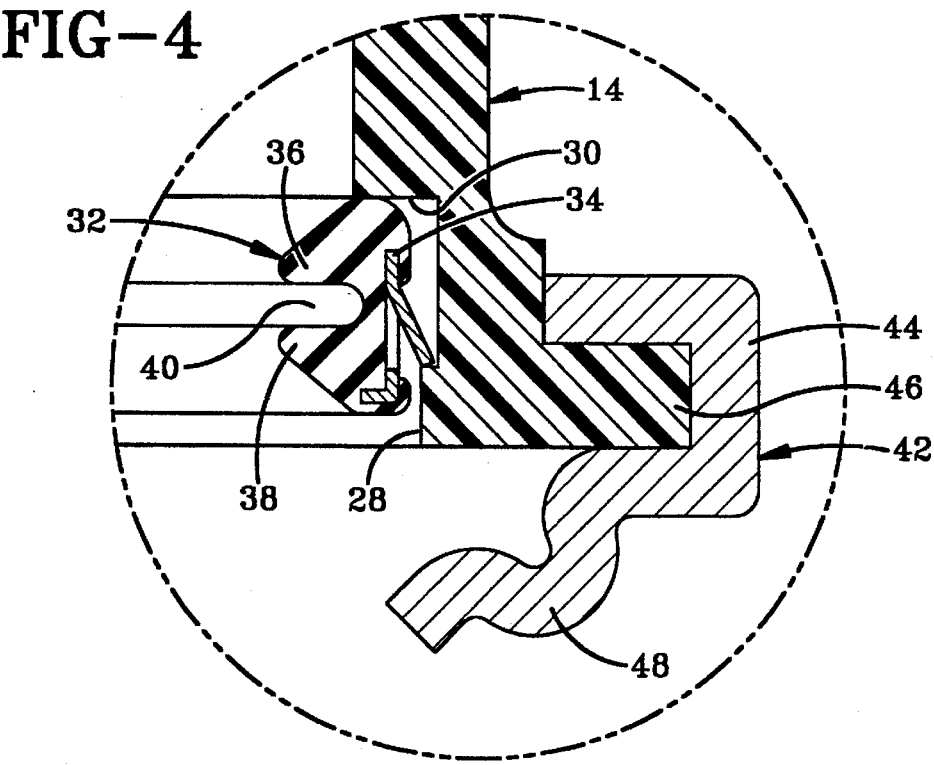
FIG. 4 is an enlarged view of the encircled portion of FIG. 1.
Figure 5:
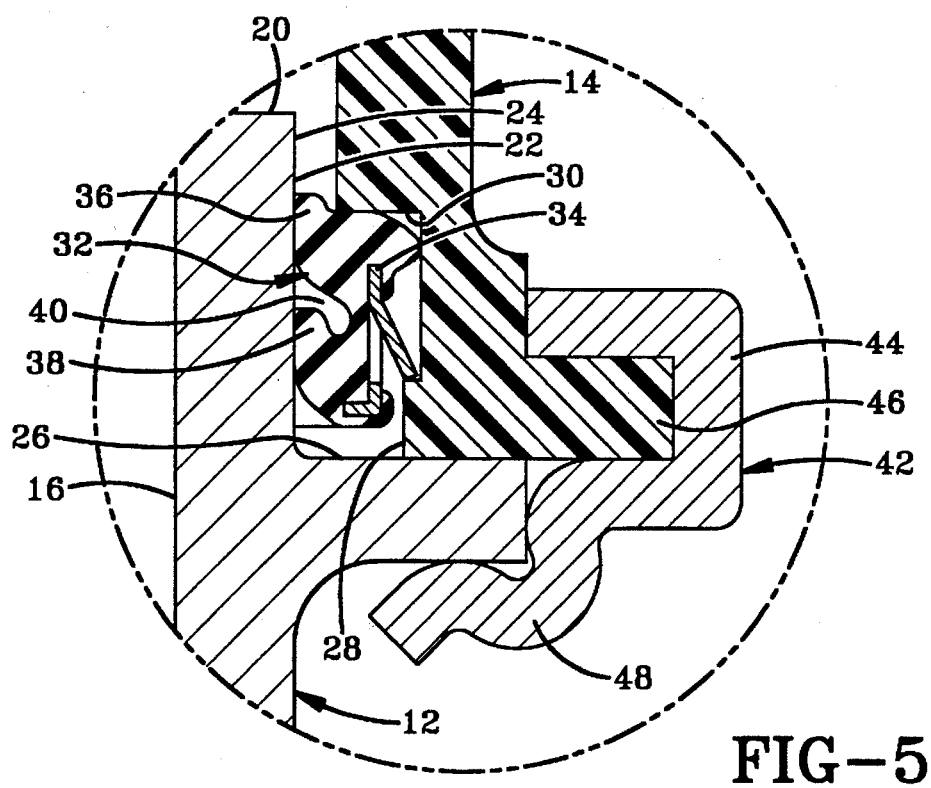
FIG. 5 is an enlarged view of the encircled portion of FIG. 3.

Transfer duct 14 includes an opening 28 having a diameter which corresponds with the outer diameter of the annular wall 24 of throttle body 12. About the inside of the opening 28 is formed a shoulder 30, FIGS. 4 and 5, which facilitates the location of a seal member 32. In the preferred embodiment disclosed herein, the seal member 32 is configured as a radial wiper seal which includes a circumferential seal base 34. Two radially inwardly directed wiper seal members 36 and 38 extend from the base 34 and are separated by a seal space 40. The two seal members operate to define an inner diameter about duct opening 28 which is less than the outer diameter of the annular outer wall 24 of the throttle body annulus 22.

The transfer duct 14 engages the inlet end 20 of the throttle throat 16 by placement of the duct opening 28 over the throttle body annulus 22. As the annulus 22 enters the duct opening 28 the radial wiper seal members 36 and 38 engage the outer annular wall 24 and are deformed or flexed longitudinally, FIG. 5, to form an air-tight seal between the throttle body 12 and the transfer duct opening 28. The seal space 40 provides clearance for the deformation of the wiper seal member 38 thereby ensuring even loading of both seal members. Although the preferred embodiment of the present invention discloses a radial wiper seal 32 having two radial seal members 36,38 it is contemplated that a seal member having a single wiper seal may be used in some cases.

Figure 2:
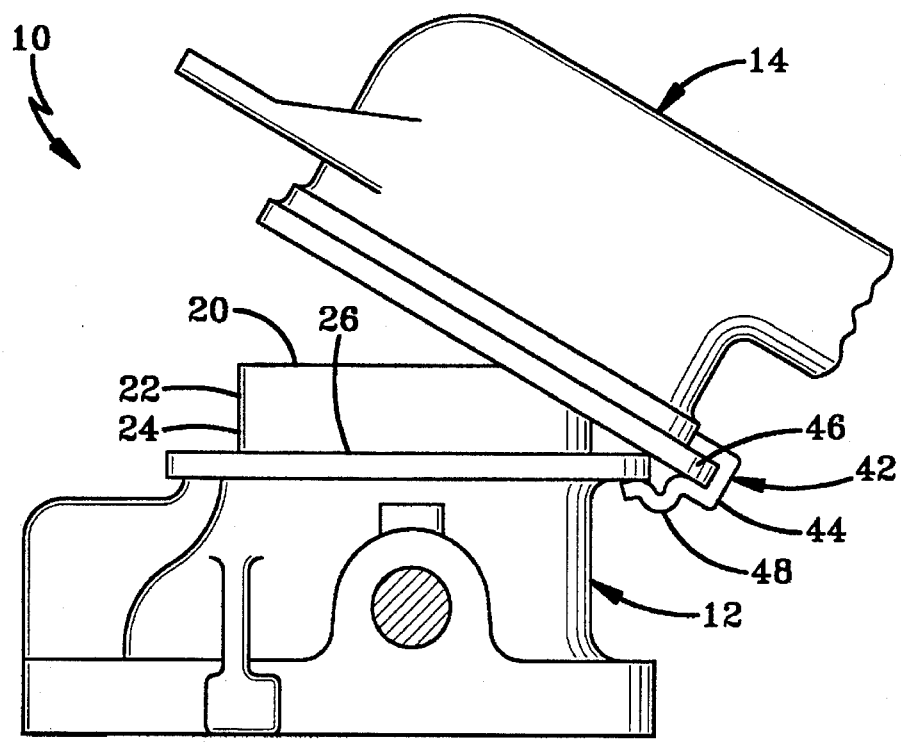
FIG. 2 is a partially assembled side view of the inlet assembly of FIG. 1.
Figure 3:
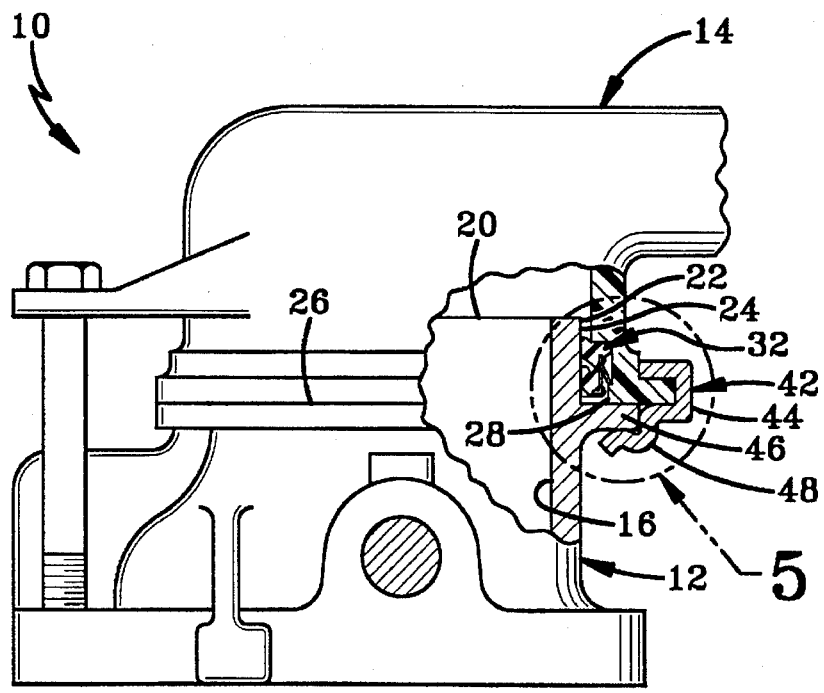
FIG. 3 is a fully assembled side view of the inlet assembly of FIG. 1.

To ensure proper seating of the wiper seal members 36,38 with respect to the outer annular wall 24 of the throttle body annulus 22, the transfer duct 14 includes a pivot clip 42 which is useful in locating the duct relative to the throttle body thereby improving the ease and accuracy of assembly. The pivot clip 42 includes means for securing the clip to the transfer duct. In the case of the embodiment shown in FIGS. 4 and 5, attachment of the clip 42 is through a U-shaped bracket 44 located at a first end of the clip member. The U-shaped bracket 44 engages a mounting shoulder 46 which extends outwardly from the edge of the opening 28 in the transfer duct 14. When attached to the transfer duct 14, adjacent opening 28, the pivot clip 42 has angularly extending mounting tabs 48 which protrude towards the duct opening 28. The pivot clip mounting tabs 48 extend under corresponding mounting shoulder 46 allowing the transfer duct opening 28 to be rotated over the throttle body annulus 22, as illustrated in FIGS. 2 and 3, thereby accurately seating the wiper seals 36,38 against the outer annular wall 24.

The present invention discloses an improved assembly for sealing the connection between air transfer ducts for an internal combustion engine. In the particular embodiment disclosed herein, the invention is shown applied to the joint between the engine throttle body and the air transfer duct. It is however contemplated that the disclosed invention has equal application to other, similar joints such as those between two connecting transfer ducts.

The disclosed invention utilizes a seal assembly including radial wiper seals which engage an annular wall extending about the throttle body opening. The wiper seals effectively seal the connection without the requirement of a typical clamping device and the seal extends between the surfaces to be sealed thereby avoiding significant environmental degradation.

Additionally, the present invention utilizes a pivot clip for positioning the transfer duct opening with respect to the throttle body inlet to thereby assure that the wiper seal is properly sealed between the two components while simplifying the installation.

We claim:

1. A throttle body inlet assembly comprising a throttle body having an inlet opening with an annulus extending thereabout, said annulus defining a longitudinally extending outer annular wall terminated by a shoulder, said assembly further comprising an air transfer duct having an opening therein with a diameter corresponding to said outer annular wall and having a seal member disposed thereabout, said seal member comprising a semi-rigid base having radially inwardly extending, flexible wiper seals operable to flex against said annular wall of said throttle body annulus as said opening in said duct is placed over said throttle annulus, said transfer duct further comprising a pivot clip mounted adjacent said opening and having angularly extending mounting tabs extending from said duct and operable to engage a shelf portion of said throttle body shoulder to position said duct with respect to said throttle body as said duct opening is engaged over said throttle body annulus.

2. A throttle body inlet assembly comprising a throttle body having an inlet opening defining an annular wall thereabout, said assembly further comprising an air transfer duct having an opening therein with a diameter corresponding to said outer annular wall and having a seal member disposed thereabout, said seal member comprising a radially inwardly extending flexible wiper seal operable to flex against said annular wall of said throttle body annular wall as said opening in said duct is placed over said inlet opening, and a pivot clip having mounting tabs extending from said duct and operable to engage a shelf portion disposed adjacent said throttle body inlet to position said duct opening with respect to said throttle body inlet as said duct opening is engaged over said annular wall with said flexible wiper seal disposed therebetween.

* * * * *